(12) United States Patent
Lin et al.

(10) Patent No.: US 10,477,230 B2
(45) Date of Patent: Nov. 12, 2019

(54) METHOD AND APPARATUS OF DISPARITY VECTOR DERIVATION FOR THREE-DIMENSIONAL AND MULTI-VIEW VIDEO CODING

(71) Applicant: MediaTek Inc., Hsin-Chu (TW)

(72) Inventors: Jian-Liang Lin, Su'ao Township, Yilan County (TW); Yi-Wen Chen, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 32 days.

(21) Appl. No.: 14/762,873

(22) PCT Filed: Apr. 2, 2014

(86) PCT No.: PCT/CN2014/074601
§ 371 (c)(1),
(2) Date: Jul. 23, 2015

(87) PCT Pub. No.: WO2014/166349
PCT Pub. Date: Oct. 16, 2014

(65) Prior Publication Data
US 2015/0365694 A1    Dec. 17, 2015

Related U.S. Application Data

(60) Provisional application No. 61/810,379, filed on Apr. 10, 2013.

(51) Int. Cl.
*H04N 19/513* (2014.01)
*H04N 19/597* (2014.01)
(Continued)

(52) U.S. Cl.
CPC ......... *H04N 19/513* (2014.11); *H04N 19/132* (2014.11); *H04N 19/176* (2014.11); *H04N 19/52* (2014.11); *H04N 19/597* (2014.11)

(58) Field of Classification Search
CPC .............................. H04N 19/597; H04N 19/56
(Continued)

(56) References Cited

U.S. PATENT DOCUMENTS 8,532,410 B2    9/2013  Tian et al.
8,823,821 B2 *  9/2014  Tian ...................... H04N 7/181
                                                            348/218.1
(Continued)

FOREIGN PATENT DOCUMENTS

CN      101785317      7/2010
CN      102017627      4/2011
(Continued)

OTHER PUBLICATIONS

View Synthesis for Multiview Video Compression; Martimian; 2006.*
(Continued)

*Primary Examiner* — Luis Perez-Fuentes
(74) *Attorney, Agent, or Firm* — McClure, Qualey & Rodack, LLP (57) ABSTRACT

A method and apparatus for determining a derived disparity vector (DV) directly from associated depth block for motion vector prediction in three-dimensional video encoding or decoding are disclosed. Input data associated with current motion information of a current texture block of a current texture picture in a current dependent view and a depth block associated with the current texture block are received. The derived DV for the current texture block based on the depth block is then determined and used for inter-view or temporal motion vector prediction (MVP). If the current motion information corresponds to inter-view prediction, the current DV is encoded or decoded using the derived DV as a MVP. If the current motion information corresponds to temporal prediction, the current MV is encoded or decoded using a
(Continued)

derived MV of a corresponding texture block in a reference view as the MVP.

18 Claims, 6 Drawing Sheets

(51) Int. Cl.
    *H04N 19/52* (2014.01)
    *H04N 19/176* (2014.01)
    *H04N 19/132* (2014.01)

(58) Field of Classification Search
    USPC .................................................. 375/240.16
    See application file for complete search history.

(56) References Cited

U.S. PATENT DOCUMENTS

| | | | |
|---|---|---|---|
| 8,964,844 B2 | 2/2015 | Lai et al. | |
| 9,237,345 B2* | 1/2016 | Kang | H04N 19/597 |
| 9,264,691 B2* | 2/2016 | Zou | H04N 19/597 |
| 9,319,657 B2* | 4/2016 | Kang | H04N 19/597 |
| 9,635,357 B2* | 4/2017 | Zhang | H04N 19/56 |
| 9,736,454 B2* | 8/2017 | Hannuksela | H04N 13/161 |
| 9,781,416 B2* | 10/2017 | Zhang | H04N 19/56 |
| 9,900,576 B2* | 2/2018 | Thirumalai | H04N 19/597 |
| 2010/0266042 A1* | 10/2010 | Koo | H04N 19/597 |
| | | | 375/240.16 |
| 2011/0038418 A1* | 2/2011 | Pandit | G06T 9/001 |
| | | | 375/240.16 |
| 2013/0229485 A1* | 9/2013 | Rusanovskyy | H04N 13/0048 |
| | | | 348/43 |
| 2013/0287093 A1* | 10/2013 | Hannuksela | H04N 19/00769 |
| | | | 375/240.02 |
| 2013/0336405 A1* | 12/2013 | Chen | H04N 19/597 |
| | | | 375/240.16 |
| 2013/0342644 A1* | 12/2013 | Rusanovskyy | H04N 19/597 |
| | | | 348/43 |
| 2014/0240456 A1* | 8/2014 | Kang | H04N 19/597 |
| | | | 348/42 |
| 2014/0241431 A1* | 8/2014 | Zhang | H04N 19/56 |
| | | | 375/240.16 |
| 2014/0267605 A1* | 9/2014 | Thirumalai | H04N 13/0048 |
| | | | 348/43 |
| 2014/0269898 A1* | 9/2014 | Thirumalai | H04N 19/597 |
| | | | 375/240.02 |
| 2014/0286423 A1* | 9/2014 | Chen | H04N 19/597 |
| | | | 375/240.16 |
| 2014/0341289 A1* | 11/2014 | Schwarz | H04N 19/597 |
| | | | 375/240.16 |
| 2014/0341292 A1* | 11/2014 | Schwarz | H04N 19/597 |
| | | | 375/240.16 |
| 2015/0201216 A1* | 7/2015 | Lin | H04N 19/597 |
| | | | 348/42 |
| 2015/0264397 A1* | 9/2015 | Lin | H04N 19/597 |
| | | | 375/240.16 |
| 2015/0341664 A1* | 11/2015 | Zhang | H04N 19/597 |
| | | | 375/240.12 |
| 2015/0358600 A1* | 12/2015 | Lin | H04N 19/597 |
| | | | 348/43 |
| 2015/0365694 A1* | 12/2015 | Lin | H04N 19/597 |
| | | | 375/240.16 |
| 2015/0382019 A1* | 12/2015 | Chen | H04N 19/597 |
| | | | 348/43 |
| 2016/0191939 A1* | 6/2016 | Lin | H04N 19/52 |
| | | | 375/240.16 |

FOREIGN PATENT DOCUMENTS

| | | |
|---|---|---|
| WO | WO 2009/131688 | 10/2009 |
| WO | WO 20121171442 | 12/2012 |
| WO | WO 2013/068547 | 5/2013 |
| WO | WO 2014/000664 | 1/2014 |
| WO | WO 2014/106496 | 7/2014 |

OTHER PUBLICATIONS

3DV-CE1: Block-based View Synthesis Prediction for 3DV-ATM; Nokia; Jul. 2012.*
3DV-CE1: Backward View Synthesis Prediction using Neighbouring Blocks; Mitsubishi; Jan. 2013.*
MVC inter-view skip mode with Depth information; Gang Zhu, 2010.*
View scalable multiview video coding using 3-D warping with depth map; Shimizu; Nov. 2007.*
Analysis of Motion Vector Predictor in Multiview Video Coding System; Seungchul; May 2011.*
Selective disparity estimation and variable size ME; Shen; 2009; (Year: 2009).*
WD-1 Working draft of High efficiency video coding; Wiegand; 2010; (Year: 2010).*
3D HEVC Test Model 1; Wegner; 2012; (Year: 2012).*
Improvement for disparity vector derivation; Kang; 2012; (Year: 2012).*
International Search Report dated Jun. 27, 2014, issued in application No. PCT/CN2014/074601.
Lin, J.L., et al.; "3D-CE5.a results on unification of the depth to DV conversion," Joint Collaborative Team on 3D Video Coding Extension Development of ITU-T SG 15 WP 3 and ISO/IEC JTC 1/SC 29/WG 11; Oct. 2012; pp. 1-4.
Lin, J.L., et al.; "3D-CE2.a related Simplification disparity vector derivation in Skip mode and Direct mode;" Joint Collaborative Team on 3D Video Coding Extension Development of ITU-T SG 15 WP 3 and ISO/IEC JTC 1/SC 29/WG 11; Apr. 2013; pp. 1-4.
Konieczny, J., et al.; "Extended Inter-View Direct Mode for Multiview Video Coding;" pp. 1-4.
Bang, G., et al.; "3D-CE5.a related Simplification on the disparity vector derivation;" Joint Collaborative Team on 3D Video Coding Extension Development of ITU-T SG 15 WP 3 and ISO/IEC JTC 1/SC 29/WG 11; Oct. 2012; pp. 1-6.
Jung, J., et al.; "CE1.h related Adaptive method for Depth Oriented Neighboring Block Disparity Vector;" Joint collaborative Team on 3D Video Coding Extension Development of ITU-T SG 15 WP 3 and ISO/IEC JTC 1/SC 29/WG 11; Jan. 2013; pp. 1-6.
Lin, J.L., et al.; "3D-CE5.h related Simplification on disparity vector for HEVC-based 3D video coding;" Joint collaborative Team on 3D Video Coding Extension Development of ITU-T SG 15 WP 3 and ISO/IEC JTC 1/SC 29/WG 11; Jul. 2012; pp. 1-4.
Nam, J., et al.; "3D-HEVC-CE3 result on KWU's advanced motion and disparity prediction method based on global disparity;" International Organisation fro Standardisation; Feb. 2012; pp. 1-6.

* cited by examiner

*Prior Art*

FIG.3

*Prior Art*

METHOD AND APPARATUS OF DISPARITY VECTOR DERIVATION FOR THREE-DIMENSIONAL AND MULTI-VIEW VIDEO CODING

CROSS REFERENCE TO RELATED APPLICATIONS

The present invention is a National Phase Application of PCT Application No. PCT/CN2014/074601, filed on Apr. 2, 2014, which claims priority to U.S. Provisional Patent Application, Ser. No. 61/810,379, filed on Apr. 10, 2013, entitled "Methods of depth to disparity derivation in 3D or multi-view video coding". The priority applications are hereby incorporated by reference in their entireties.

TECHNICAL FIELD

The present invention relates to three-dimensional video coding. In particular, the present invention relates to disparity vector derivation for motion vector prediction (MVP) for inter-view prediction and Skip/Direct mode in 3D and multi-view video coding.

BACKGROUND

Three-dimensional (3D) television has been a technology trend in recent years that intends to bring viewers sensational viewing experience. Various technologies have been developed to enable 3D viewing. Among them, the multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

A straightforward approach may be to simply apply conventional video coding techniques to each single-view video sequence independently and disregard any correlation among different views. Such coding system would be very inefficient. In order to improve efficiency of multi-view video coding, typical multi-view video coding exploits inter-view redundancy. Therefore, most 3D Video Coding (3DVC) systems take into account of the correlation of video data associated with multiple views and depth maps. Some 3D video coding standards are being developed by extending existing standards intended for 2D video. For example, there are emerging 3D coding standards based on AVC (Advanced video coding) and HEVC (High Efficiency Video Coding). In these standards, disparity vector (DV) has been widely used in various coding applications to locate a corresponding block in a reference view.

In the AVC-based 3D coding (3D-AVC), the disparity vector for a current texture block is derived differently for different coding tools. For example, the maximum of the depth block associated with a current texture block is used as the disparity vector for the current texture block when VSP (View Synthesis Prediction) or DMVP (Depth-based Motion Vector Prediction) coding mode is selected. On the other hand, the disparity vector derived based on neighboring blocks is used for disparity-based Skip and Direct modes. In this disclosure, both motion vector (MV) and disparity vector (DV) are considered part of motion information associated with a block. Motion vector prediction may refer to prediction for MV as well as for DV.

In the DV derivation approach based on the maximum of the depth block, the disparity vector for currently coded texture block Cb is derived from the depth block, d(Cb) associated with the current texture block Cb. Depth map samples located at four corners (i.e., top-left, top-right, bottom-left, bottom-right) of the depth block, d(Cb) are compared. The maximal depth map value among the four depth values is converted to disparity value according to a camera model. In the case of depth map with reduced resolution, spatial coordinates of the four corners of the current texture block are downscaled to match the depth map resolution.

In the DV derivation approach based on neighboring blocks, the disparity vector is derived from motion information of neighboring blocks of the current block Cb. If the motion information is not available from neighboring blocks, the disparity vector is derived from the associated depth block d(Cb) according to the DV derivation approach based on the maximum of the depth block. In a system where the depth map in a dependent view is coded before the corresponding texture picture, the associated depth block may correspond to a depth block in the current dependent view. Otherwise, the associated depth block may correspond to a depth block in a reference view that has been coded before the corresponding texture picture.

Figure 1:
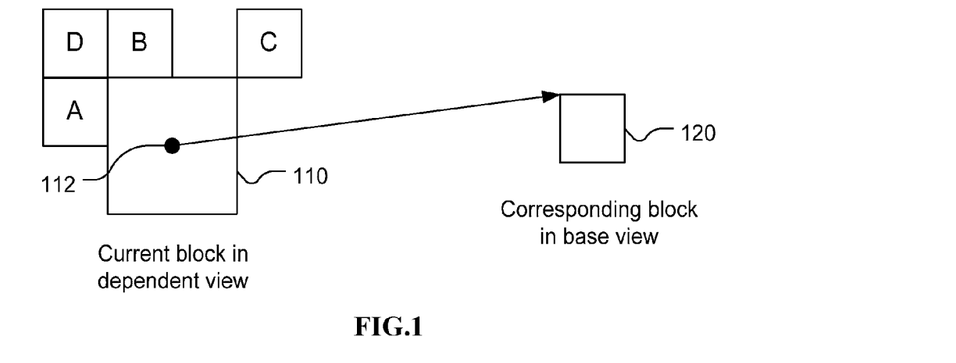
FIG. 1 illustrates the neighboring block configuration to derive the disparity vector and the usage of the derived disparity vector to identify a corresponding block in a reference view.

FIG. 1 illustrates the neighboring blocks used to derive the disparity vector and the usage of the derived disparity vector. The disparity vector is derived from the motion vectors of neighboring blocks A, B, and C (D) of a current block (110), where block D is used when block C is not available. If only one of the neighboring blocks was coded with inter-view prediction (i.e., having a DV), the DV is selected as the derived DV for the current block Cb. If multiple disparity vectors are available from blocks A, B, C (D), the derived DV is determined from the median of available DVs. If none of neighboring blocks A, B and C(D) has a valid DV, the derived DV is then determined from a converted DV, where the converted DV is obtained by converting a depth value of the depth block associated with the current texture block according to a camera model. The derived DV is then used to locate a corresponding block in the base view. The corresponding block (120) in the base view is determined by offsetting the center point (112) of the current point by the derived DV. The operation is similar to locate a reference block using motion compensation. Accordingly, the operation can be implemented using the existing motion compensation module by treating the derived DV as a motion vector (MV).

Figure 2:
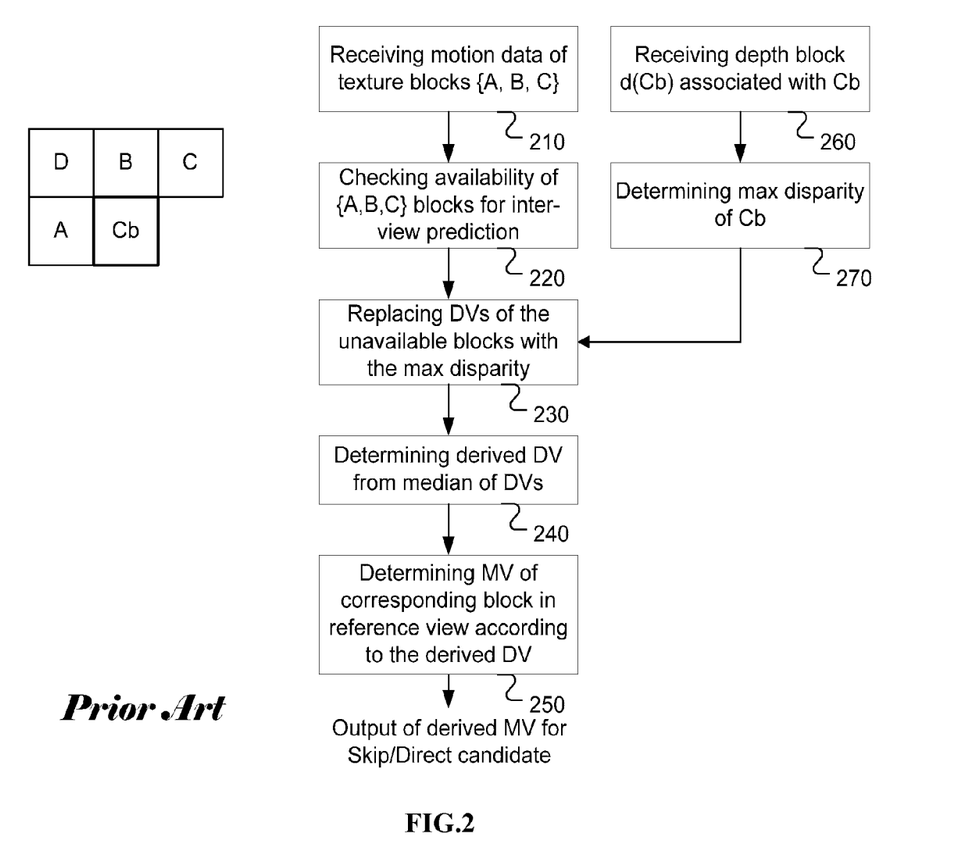
FIG. 2 illustrates an example of the flowchart for the neighboring blocks-based DV derivation (NBDV) for disparity-based Skip and Direct modes according to existing AVC-based (Advanced Video Coding based) three-dimensional video coding.

FIG. 2 illustrates an example of the flowchart for the neighboring blocks-based DV derivation for disparity-based Skip and Direct modes. The motion data associated with neighboring texture blocks A, B and C(D) are received as shown in step 210. When the motion information associated with block C is not available, motion information associated with block D is used. The motion data may correspond to inter-view motion data (i.e., DV) or temporal motion data (i.e., MV). The availability of inter-view motion information (i.e., DV) of neighboring blocks A, B and C(D) are checked in step 220. If only one neighboring block is coded with inter-view prediction, the motion information (i.e., DV) is used as the derived DV. If more than one neighboring block is coded with inter-view prediction, the unavailable DV from any neighboring is replaced by the max disparity as shown in step 230. The derived DV is determined from the median of the three candidate DVs as shown in step 240. After the derived DV is determined, a corresponding block in the reference view is located using the derived DV as shown in step 250. The motion vector of the corresponding block is then used for disparity-based Skip or Direct motion vector predictor.

Disparity vector is also used in other coding tools in 3D coding systems. For example, 3D-AVC also includes Direction-Separated MVP (DS-MVP) coding tool. In 3D-AVC, the median-based MVP is restricted to identical prediction directions of motion vector candidates. In DS-MVP, all available neighboring blocks are classified according to the direction of their prediction (i.e., temporal or inter-view).

Figure 3:
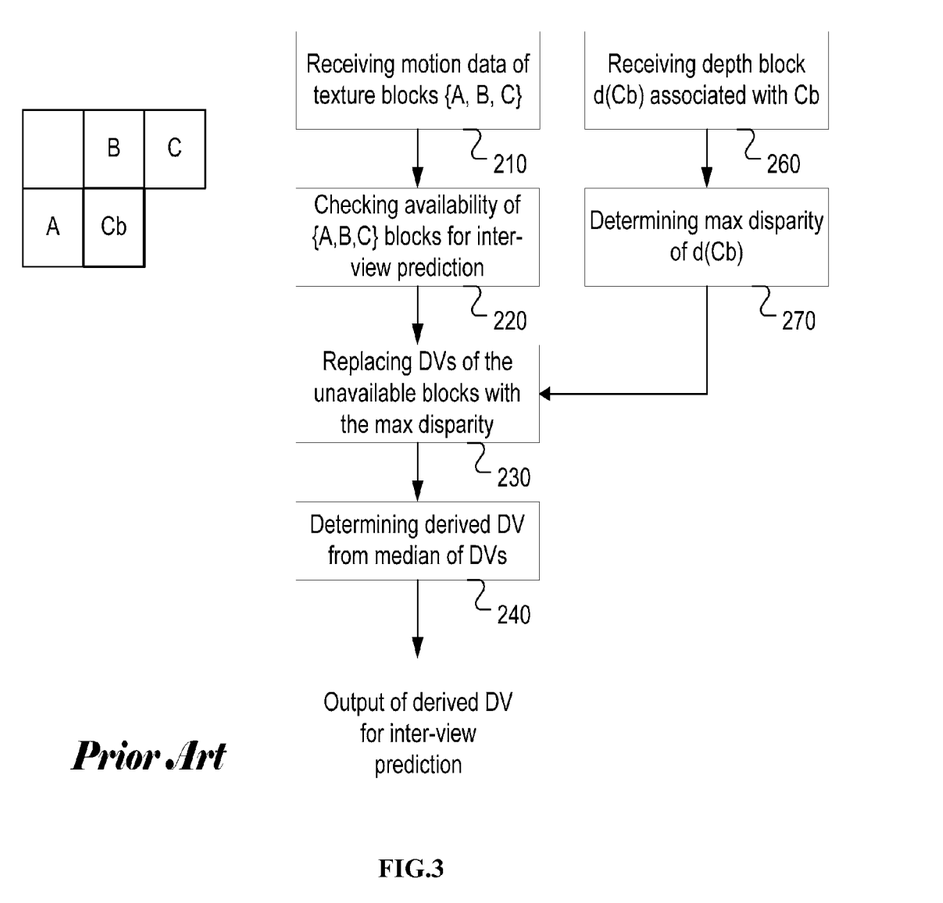
FIG. 3 illustrates an example of the flowchart of DV derivation of motion vector prediction for inter-view prediction in existing AVC-based (Advanced Video Coding based) three-dimensional video coding.

For the inter-view prediction, if the current block Cb uses an inter-view reference picture, all neighboring blocks that do not utilize inter-view prediction are marked as unavailable for MVP. Motion vectors of the neighboring blocks marked as unavailable are replaced with disparity vector derived from depth data associated with Cb instead of a zero motion vector. The DV derived from the depth data is then included as a MV candidate for the median operation to determine the derived DV. The DV derived from the depth data associated with the current block Cb is derived according to the "maximal out of four corners". The flowchart of the inter-view prediction process is shown in FIG. 3. The steps involved are substantially the same as the steps in FIG. 2 except that step 250 is not used. As shown in FIG. 3, after the derived DV is obtained, the derived DV is used as the MVP (i.e., inter-view prediction) for the current block.

Figure 4:
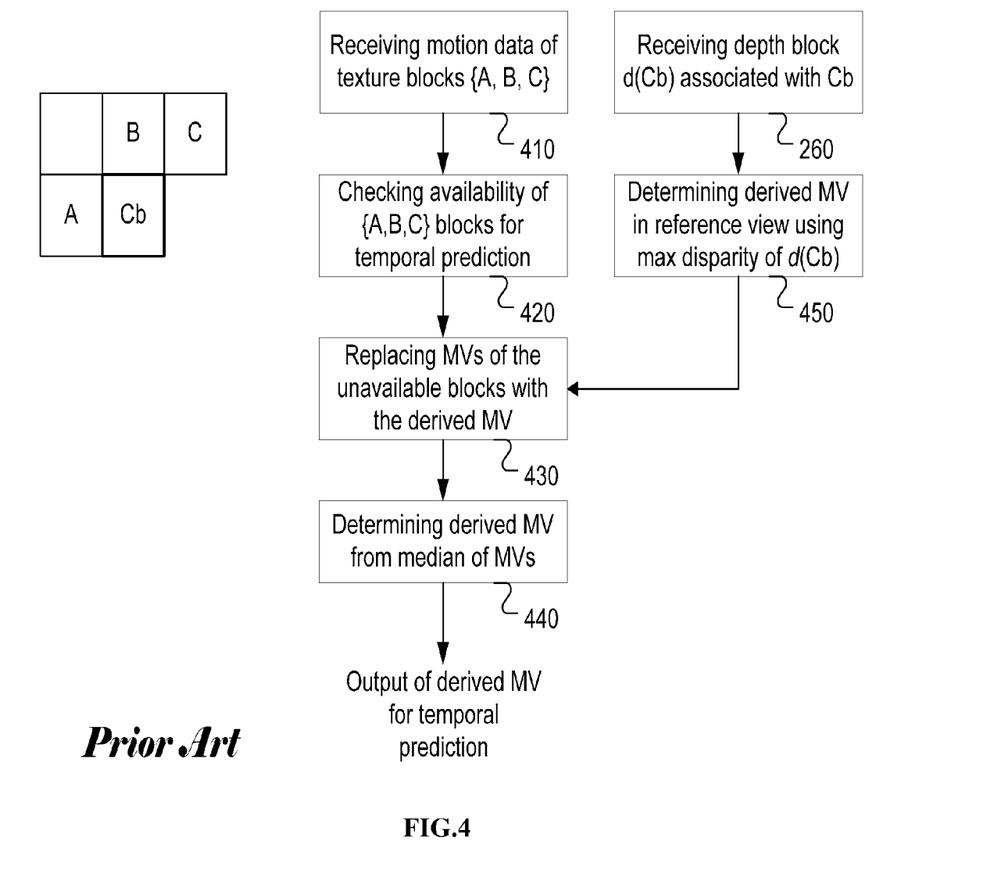
FIG. 4 illustrates an example of the flowchart of DV derivation of motion vector prediction for temporal prediction in existing AVC-based (Advanced Video Coding based) three-dimensional video coding.

For the Inter prediction, if the current block Cb uses temporal prediction, neighboring blocks that use inter-view reference frames are marked as unavailable for MVP. Motion vectors of the neighboring blocks marked as unavailable are replaced with a motion vector of a corresponding block in a reference view. The corresponding block is derived by applying a derived disparity vector to the coordinates of the current texture block. The derived disparity vector can be determined according to "maximal out of four corners". If corresponding block is not coded with Inter prediction (i.e., no MV available), a zero vector is considered. The flowchart of the Inter prediction process is shown in FIG. 4. The motion data associated with neighboring blocks A, B and C(D) is received in step 410. The motion data in this case corresponds to temporal motion (i.e., MV). The availability of MV of the neighboring blocks is checked in step 420. If any neighboring block is not temporal predicted, (i.e., no MV), the MV is replaced by a derived MV as shown in step 430. The derived MV corresponds to the MV of a corresponding block in a reference view as shown in step 450 and the corresponding block is located by the derived DV determined according to "maximal out of four corners". The derived MV is determined based on the median of candidate MVs as shown in step 440.

Disparity-based Skip/Direct mode is another coding tool in 3D-AVC. In the Skip/Direct modes, motion information is not coded. Instead the motion information is derived at both encoder and decoder sides through an identical process. Motion information for coding of the current block Cb in Skip/Direct modes is derived from motion information of the corresponding block in the base view. The correspondence between the current block Cb and the corresponding block in the base view is established through a disparity vector by applying the DV to the central point of the current block Cb as shown in FIG. 1. A motion partition referenced by this vector in the base view provides motion information (i.e., reference index and motion vectors) for coding of the current block Cb.

The disparity derivation procedure for this mode is referred as "Neighboring blocks based derivation" and the process can be illustrates using the flowchart in FIG. 2. If the corresponding block in the base view is not available, the direction-separated MVP (DS-MVP) as mentioned earlier is used to derive the DV by setting the reference index to zero.

As described above, DV derivation is critical in 3D and multi-view video coding. The DV derivation process used in the current 3D-AVC is quite complicated. It is desirable to simplify the DV derivation process.

SUMMARY

A method and apparatus for determining a derived disparity vector (DV) directly from associated depth block for motion vector prediction in three-dimensional video and multi-view encoding or decoding are disclosed. According to the present invention, the input data associated with a current texture block of a current texture picture in a current dependent view and a depth block associated with the current texture block are received. A derived DV (disparity vector) for the current texture block based on the depth block is then determined and the derived DV is used for locating a corresponding block in a reference view. The motion information of the corresponding block is then used as Skip or Direct candidate for encoding of decoding of the current block.

One aspect of the present invention addresses the derivation process of the derived disparity vector. For example, the derived DV can be determined according to a maximum depth value among depth samples at four corners of the depth block. The derived DV may also be determined according to a single depth sample of the depth block. The single depth value may correspond to the depth sample at a center location of the depth block. The single depth value may also correspond to the depth sample at location (0, 0), (M−1, N−1), (M/2−1, N/2−1), (M/2−1, N/2+1), (M/2+1, N/2−1), or (M/2+1, N/2+1) for an M×N texture block, where M and N are positive integers.

In another embodiment, the derived DV is determined based on at least two depth samples of the depth block. For example, the derived DV can be determined based on the depth samples at four corners of the depth block, based on a center location and four corners of the depth block, or based on the depth samples at two corners of the depth block.

In yet another embodiment, the derived DV is derived by determining a first depth value corresponding to an average, median, or majority of depth samples of the depth block, and converting the first depth value to the derived DV.

A method for determining a derived disparity vector (DV) directly from associated depth block for motion vector prediction in three-dimensional video and multi-view encoding or decoding are disclosed. According to the present invention, the input data associated with current motion information of a current texture block of a current texture picture in a current dependent view and a depth block associated with the current texture block are received. A derived DV (disparity vector) for the current texture block based on the depth block is then determined and the derived DV is used for inter-view motion vector prediction or temporal motion vector prediction. If the current motion information corresponds to inter-view prediction having a current DV pointing to an inter-view reference picture, the current DV is encoded or decoded using the derived DV as a MVP (motion vector predictor). If the current motion information corresponds to temporal prediction having a current MV (motion vector) pointing to a temporal reference picture, the current MV is encoded or decoded using a derived MV of a corresponding texture block in a reference view as the MVP, wherein the corresponding texture block in the reference view is located according to the derive DV and position of the current texture block.

DETAILED DESCRIPTION

As described above, DV is critical in 3D/multi-view video coding and the DV derivation process in conventional 3D-AVC is quite complicated. Accordingly, in embodiments of the present invention, a derived disparity vector is obtained directly from the collocated depth block.

According to the present invention, the disparity vector is derived from the associated block d(Cb) of depth data and used for MVP in inter-view prediction and disparity-based Skip/Direct mode. The derived DV is determined from the maximum of the depth block. For example, the maximum value of four corners of the depth block d(Cb) is utilized to derive disparity from depth map. This particular depth-to-disparity derivation is referred as "maximal out of four corners". The converted DV according to "maximal out of four corners" is used to locate a corresponding block in the base view by offsetting the center point of the current block by the converted DV. The motion information of the corresponding block is used to derive the MVP in Skip/Direct mode.

Figure 5:
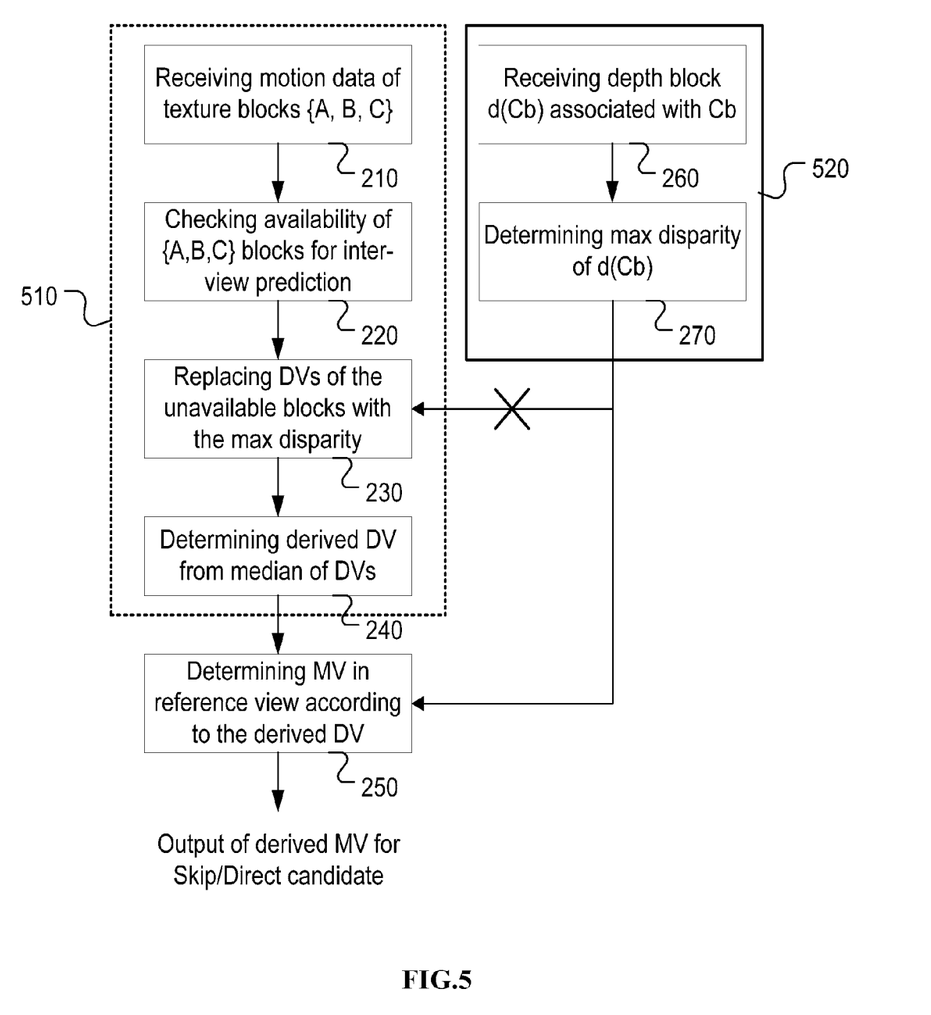
FIG. 5 illustrates an example of the flowchart of DV derivation of motion vector prediction for Skip/Direct mode according to an embodiment of the present invention.
Figure 6:
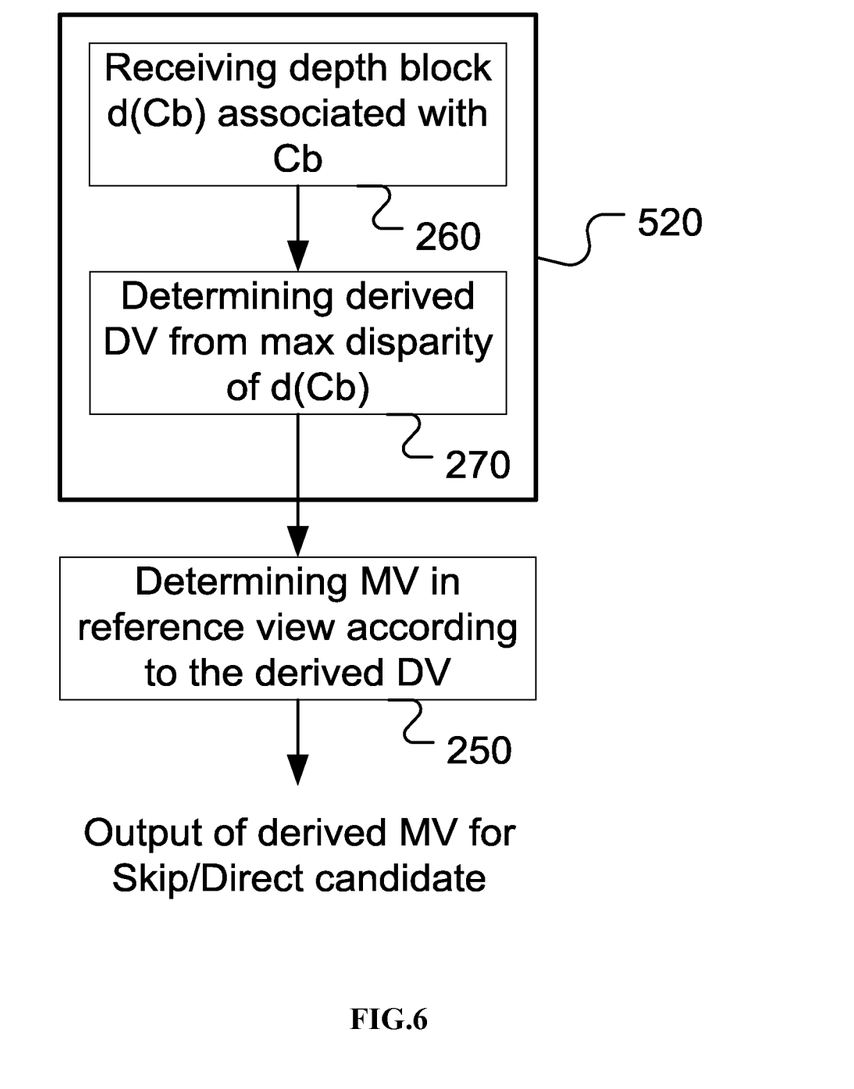
FIG. 6 illustrates an example of the flowchart of DV derivation of motion vector prediction for Skip/Direct mode according to an embodiment of the present invention.

The performance of a 3D/multi-view video coding system incorporating an embodiment of the present invention is compared with the performance of a conventional system based on ATM-8.0 (3D-AVC Test Model version 8.0) as shown in Table 1, where ATM-8.0 uses the DV derivation process as shown in FIG. 2. On the other hand, the system incorporating an embodiment of the present invention uses simplified DV derivation as shown in FIG. 6. FIG. 5 shows the changes made from the Skip/Direct candidate derivation method in FIG. 2 to the simplified method in FIG. 6. As shown in FIG. 5, the steps enclosed in box 510 are skipped. The output from steps enclosed in box 520 will not be fed to step 230. Instead, the disparity converted from the maximum value in step 270 is used to locate a block in a reference view for determined a derived MV as shown in step 250. The performance comparison is based on different sets of test data listed in the first column (i.e., test data S01-S06 and S08). The BD-rate differences are shown for maintaining the same peak signal to noise ratio (PSNR). A negative value in the BD-rate implies that the present invention has a better performance. As shown in Table 1, the bitrate measure for the texture coding, the total bitrate (texture bitrate and depth bitrate) and the total bitrate for synthesized video (Synth.) are about the same as the conventional ATM-8.0. The processing times (encoding time and decoding time) are also compared. As shown in Table 1, there is almost no performance loss due to the simplified DV derivation. The computational complexity in terms of encoding time and decoding is also about the same.

TABLE 1

| | Texture Coding | | Total (Coded) | | Total (Synth.) | | Complexity estimate | |
|---|---|---|---|---|---|---|---|---|
| | dBR, % | dPSNR, dB | dBR, % | dPSNR, dB | dBR, % | dPSNR, dB | Enc Time, % | Dec Time, % |
| S01 | 0.08 | 0.00 | 0.08 | 0.00 | 0.01 | 0.00 | 99.67 | 101.61 |
| S02 | 0.02 | 0.00 | 0.02 | 0.00 | 0.02 | 0.00 | 99.77 | 98.20 |
| S03 | 0.01 | 0.00 | 0.01 | 0.00 | 0.02 | 0.00 | 99.69 | 98.82 |
| S04 | 0.01 | 0.00 | 0.01 | 0.00 | 0.01 | 0.00 | 99.62 | 94.24 |
| S05 | −0.01 | 0.00 | −0.01 | 0.00 | −0.01 | 0.00 | 100.53 | 100.34 |
| S06 | −0.03 | 0.00 | −0.02 | 0.00 | −0.05 | 0.00 | 99.83 | 100.14 |
| S08 | −0.01 | 0.00 | −0.01 | 0.00 | −0.01 | 0.00 | 100.38 | 101.51 |
| Average | 0.01 | 0.00 | 0.01 | 0.00 | 0.00 | 0.00 | 99.93 | 99.27 |

According to an embodiment of the present invention, the DC or offset checking procedure for the spatial neighboring blocks A, B, C(D) and any temporal block is not required. The disparity vector is directly converted from the depth value(s) in the associated depth block. The disparity vector can be converted from a single depth sample in the associated depth block. If the size of the associated depth block is M×N, the single depth pixel can be the sample at (0, 0), (M−1, N−1), (M/2−1, N/2−1), (M/2−1, N/2+1), (M/2+1, N/2−1), or (M/2+1, N/2+1), where M and N are positive integers. The single depth pixel value may correspond to the depth sample at a center location of the depth block.

The disparity vector can also be derived from at least two depth samples in the associated depth block. The at least two depth sample may correspond to the four corner depth samples in the associated depth block. Said at least two depth samples of the depth block may also correspond to depth samples at a center location and four corners of the depth block. In yet another example, said at least two depth samples of the depth block correspond to depth samples at two corners of the depth block.

The derived DV may also be derived by first determining a depth value corresponding to an average, median, or majority of depth samples of the depth block, and then converting the first depth value to the derived DV.

Figure 7:
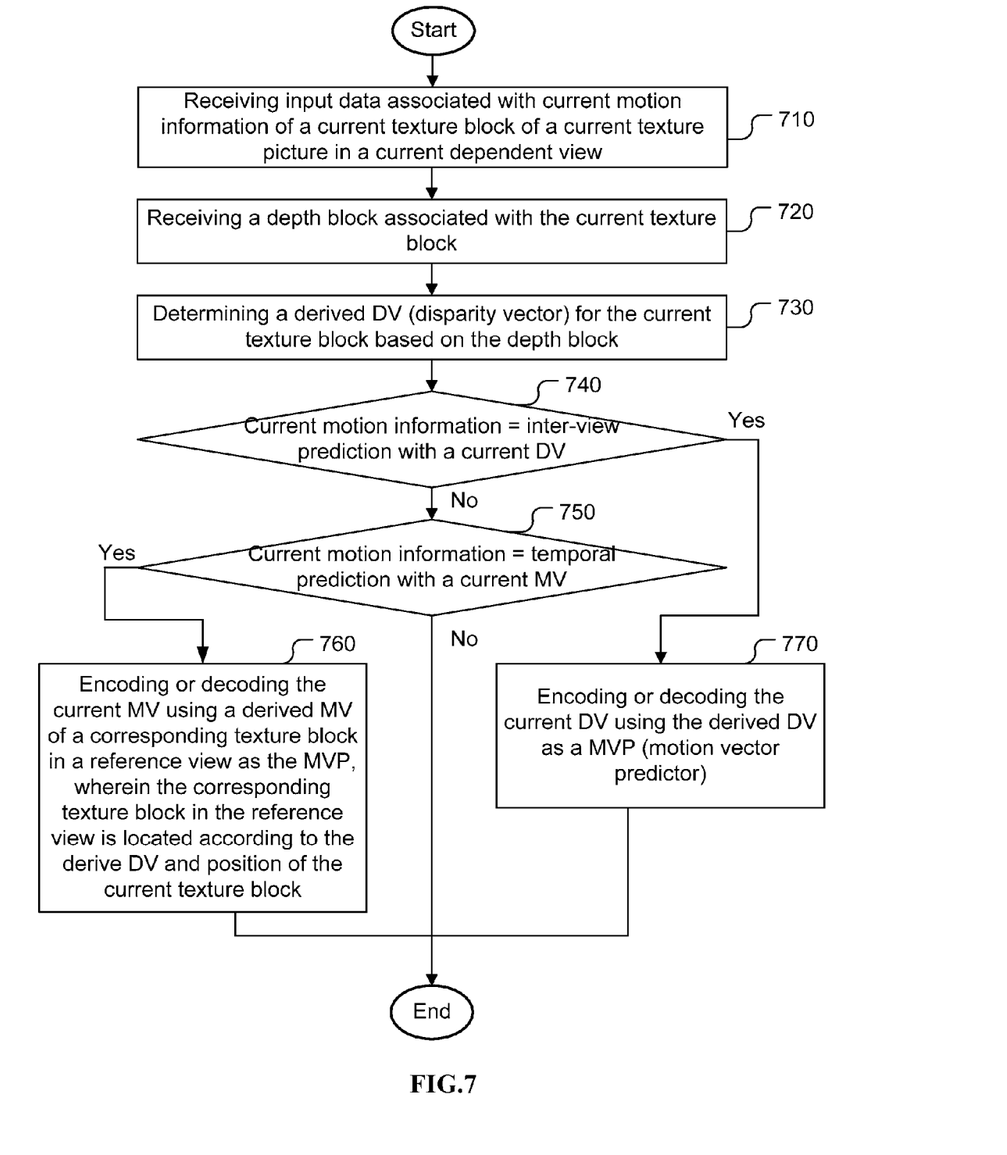
FIG. 7 illustrates an exemplary flowchart of determining a derived disparity vector directly from associated depth block for motion vector prediction in three-dimensional and multi-view video encoding or decoding according to an embodiment of the present invention.

FIG. 7 illustrates an exemplary flowchart of determining a derived disparity vector (DV) directly from associated depth block for motion vector prediction in three-dimensional/multi-view video encoding or decoding according to an embodiment of the present invention. The system receives input data associated with current motion information of a current texture block of a current texture picture in a current dependent view as shown in step 710. For encoding, the input data associated with current motion information of the current texture corresponds to motion data to be coded. The motion data may correspond to disparity vector or motion vector associated with the current texture block. For decoding, the input data corresponds to coded motion data to be decoded. The input data may be retrieved from storage such as a computer memory, buffer (RAM or DRAM) or other media. The input data may also be received from a processor such as a controller, a central processing unit, a digital signal processor or electronic circuits that produce the first data. A depth block associated with the current texture block is received as shown in step 720. A derived DV (disparity vector) for the current texture block is determined based on the depth block DV as shown in step 730. If the current motion information corresponds to interview prediction having a current DV pointing to an interview reference picture (step 740), the current DV is encoded or decoded using the derived DV as a MVP (motion vector predictor) as shown in step 770. If the current motion information corresponds to temporal prediction having a current MV (motion vector) pointing to a temporal reference picture (step 750), the current MV is encoded or decoded using a derived MV of a corresponding texture block in a reference view as the MVP as shown in step 760, wherein the corresponding texture block in the reference view is located according to the derive DV and position of the current texture block.

The flowchart shown above is intended to illustrate examples of motion vector prediction using the derived disparity vector (DV) determined directly from associated depth block. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for motion vector prediction using a derived disparity vector (DV) determined directly from an associated depth block, the method comprising:
   receiving input data associated with a current texture block of a current texture picture in a current dependent view;
   receiving a depth block associated with the current texture block;
   determining a current derived DV for the current texture block directly from the depth block without checking for availability of motion information from neighboring blocks of the current texture block;
   in response to current motion information corresponding to inter-view prediction having the current DV pointing to an inter-view reference picture, encoding the current DV using the current derived DV as a motion vector predictor (MVP);
   in response to the current motion information corresponding to temporal prediction having a current motion vector (MV) pointing to a temporal reference picture, performing the steps of:
   locating a corresponding texture block in a reference view according to the current derived DV and a position of the current texture block; and encoding the current MV using a derived MV of the corresponding texture block in the reference review as the MVP.

2. The method of claim 1, wherein the derived DV is determined according to a maximum depth value among depth samples at four corners of the depth block.

3. The method of claim 1, wherein the derived DV is determined according to a single depth sample of the depth block.

4. The method of claim 3, wherein the single depth value corresponds to the depth sample at a center location of the depth block.

5. The method of claim 3, wherein the single depth value corresponds to the depth sample at location (0, 0), (M−1, N−1), (M/2−1, N/2−1), (M/2−1, N/2+1), (M/2+1, N/2−1), or (M/2+1, N/2+1) for an M×N texture block, where M and N are positive integers.

6. The method of claim 1, wherein the derived DV is determined based on at least two depth samples of the depth block.

7. The method of claim 6, wherein said at least two depth samples of the depth block are selecting from depth samples at a center location and four corners of the depth block.

8. The method of claim 1, wherein the derived DV is derived by determining a first depth value corresponding to an average, median, or majority of depth samples of the depth block, and converting the first depth value to the derived DV.

9. The method of claim 1, wherein the depth block associated with the current texture block is in the dependent view or the reference view.

10. An apparatus for motion vector prediction using a derived disparity vector (DV) determined directly from an associated depth block, the apparatus comprising:
one or more electronic circuits configured to:
receive input data associated with a current texture block of a current texture picture in a current dependent view;
receive a depth block associated with the current texture block;
determine a current derived DV for the current texture block directly from the depth block without checking for availability of motion information from neighboring blocks of the current texture block;
in response to current motion information corresponding to inter-view prediction having the current DV pointing to an inter-view reference picture, encoding the current DV using the current derived DV as a motion vector predictor (MVP);
in response to the current motion information corresponding to temporal prediction having a current motion vector (MV) pointing to a temporal reference picture, performing the steps of:
locating a corresponding texture block in a reference view according to the current derived DV and a position of the current texture block; and
encoding the current MV using a derived MV of the corresponding texture block in the reference review as the MVP.

11. A non-transitory computer readable medium storing program instructions causing a processing circuit to perform motion vector prediction using a derived disparity vector (DV) determined directly from an associated depth block, the processing circuit being configured by the computer readable medium to perform the steps of:
receiving input data associated with current motion information of a current texture block of a current texture picture in a current dependent view;
receiving a depth block associated with the current texture block;
determining a derived DV for the current texture block directly from the depth block without checking for availability of motion information from neighboring blocks of the current texture block;
in response to the current motion information corresponding to inter-view prediction having a current DV pointing to an inter-view reference picture, encoding the current DV using the derived DV as a MVP (motion vector predictor); and
in response to the current motion information to temporal prediction having a current motion vector (MV) pointing to a temporal reference picture, encoding the current MV using a derived MV of a corresponding texture block in a reference view as the MVP,
wherein the corresponding texture block in the reference view is located according to the derive DV and position of the current texture block.

12. The non-transitory computer readable medium of claim 11, wherein the derived DV is determined according to a maximum depth value among depth samples at four corners of the depth block.

13. The non-transitory computer readable medium of claim 11, wherein the derived DV is determined according to a single depth sample of the depth block.

14. The non-transitory computer readable medium of claim 13, wherein the single depth value corresponds to the depth sample at location (0, 0), (M−1, N−1), (M/2−1, N/2−1), (M/2−1, N/2+1), (M/2+1, N/2−1), or (M/2+1, N/2+1) for an M×N texture block, where M and N are positive integers.

15. The non-transitory computer readable medium of claim 11, wherein the derived DV is determined based on at least two depth samples of the depth block.

16. The non-transitory computer readable medium of claim 15, wherein said at least two depth samples of the depth block are selecting from depth samples at a center location and four corners of the depth block.

17. The non-transitory computer readable medium of claim 11, wherein the derived DV is derived by determining a first depth value corresponding to an average, median, or majority of depth samples of the depth block, and converting the first depth value to the derived DV.

18. The non-transitory computer readable medium of claim 11, wherein the depth block associated with the current texture block is in the dependent view or the reference view.

* * * * *